(12) United States Patent  
Mizuta

(10) Patent No.: US 8,393,962 B2  
(45) Date of Patent: Mar. 12, 2013

(54) STORAGE MEDIUM STORING GAME PROGRAM AND GAME DEVICE

(75) Inventor: Masato Mizuta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1168 days.

(21) Appl. No.: 11/581,011

(22) Filed: Oct. 16, 2006

(65) Prior Publication Data

US 2007/0293315 A1 Dec. 20, 2007

(30) Foreign Application Priority Data

Jun. 15, 2006 (JP) .................................. 2006-165980

(51) Int. Cl.
*A63F 13/00* (2006.01)

(52) U.S. Cl. .............................................. 463/35; 463/1

(58) Field of Classification Search ................ 463/1, 35; 704/224, 268, 270

See application file for complete search history.

(56) References Cited

U.S. PATENT DOCUMENTS

2002/0111794 A1* 8/2002 Yamamoto et al. ........... 704/200
2002/0161882 A1* 10/2002 Chatani ......................... 709/224
2003/0115063 A1* 6/2003 Okunoki ........................ 704/266
2005/0180406 A1* 8/2005 Sagiv ............................. 370/353

FOREIGN PATENT DOCUMENTS

JP 10-320929 12/1998
JP 2002-73068 3/2002

* cited by examiner

*Primary Examiner* — David L Lewis
*Assistant Examiner* — Eric M Thomas
(74) *Attorney, Agent, or Firm* — Nixon & Vanderhye P.C.

(57) ABSTRACT

A game device issues a notification that the player is prompted to input a voice. After the notification is issued, voice data representing a voice signal, having a predetermined time length, which is inputted to a voice input element, is repeatedly acquired. Furthermore, each time the voice data is acquired, it is determined whether or not the acquired voice data satisfies a predetermined selecting condition. Thereafter, only voice data, which is determined to satisfy the selecting condition, is stored as selected voice data. The game device outputs, when a game image showing a game character speaking is displayed on the display, a sound effect representing a voice of the game character by using at least a portion of the selected voice data.

12 Claims, 11 Drawing Sheets

STORAGE MEDIUM STORING GAME PROGRAM AND GAME DEVICE

CROSS REFERENCE TO RELATED APPLICATION

The disclosure of Japanese Patent Application No. 2006-165980, filed on Jun. 15, 2006, is incorporated herein by reference.

BACKGROUND

1. Field of the Technology

The technology presented herein relates to a game program and a game device. More particularly, the present technology relates to a game program and a game device, in which a recorded voice of a player is used as a speech voice.

2. Description of the Background Art

Conventionally, in order to output a sound effect representing a speech voice, etc. of a character, for example, well-known is a technique in which a sound effect sounding as if a person spoke is outputted by using voice data previously prepared as a sound source. Patent document 1 (Japanese Laid-Open Patent Publication No. 10-320929) discloses a voice reproduction device capable of rearranging a reproduction in accordance with reproduced contents. In the voice reproduction device, voice information previously prepared is divided into pieces by specific sections, and control information is assigned to each piece of the divided voice information, thereby reproducing a voice so as to be changed in accordance with the reproduced contents.

Also, patent document 2 (Japanese Laid-Open Patent Publication No. 2002-73068) discloses a synthesized voice output device capable of outputting a speech voice of a character or the like. In the synthesized voice output device, voice data corresponding to each of word characters is previously prepared as a sound source. When a voice is reproduced, two pieces of voice data to be continuously reproduced are overlapped with each other. Thus, it is possible to output a voice sounding as if a person spoke.

Now, let us assume a case where a sound effect (a speech voice) representing a fictional language, which is used in a game world and spoken by a character appearing in a game, is outputted. Note that it is understood that the sound effect in the above case allows a player feel as if the character spoke the fictional language. Thus, the sound effect preferably sounds like a meaningless word, not a word which has a meaning. As disclosed in patent document 2, in order to output such a meaningless word, a method of preparing the voice data corresponding to each of the word characters may be used. That is, the player is prompted to input the voice data corresponding to each of the word characters. With this method, however, the player is required to input a number of meaningless voices. Thus, this method is substantially troublesome for the player. As described above, patent document 1 discloses that various processes are performed on a sound source previously prepared, and then the sound source in which the various processes have been performed is reproduced, thereby changing a voice to be reproduced. However, patent document 1 does not disclose that a sound source is acquired from a voice inputted by the player, and a process of generating the sound source is executed.

SUMMARY

Therefore, a feature of an example embodiment presented herein is to provide a game program and a game device, capable of easily generating a sound effect of a game by using a voice inputted by the player.

The example embodiment has the following features to attain the above. Note that reference numerals and supplementary remarks in parentheses below are for assisting the reader in finding corresponding components in the figures to facilitate the understanding of the example embodiment, but they are in no way intended to restrict the scope of the example embodiment.

A first aspect is directed to a computer-readable storage medium storing a game program (61) to be executed by a computer (CPU core) of a game device (10) including voice input means (a microphone 33), voice output means (speakers 30a and 30b), display means (a first LCD 11 and a second LCD 12), and memory means (a RAM 24). The game program instructs the computer to perform a notification step (step S12), and acquisition step (step S21), a determination step (steps S22 and S30), a first memory control step (steps S27 and S32), and a voice output step (step S7). The notification step notifies that a player is prompted to input a voice. The acquisition step repeatedly acquires, after the notification step, voice data representing a voice signal, having a predetermined time length, which is inputted to the voice input means. The determination step determines, each time the voice data is acquired in the acquisition step, whether or not the acquired voice data satisfies a predetermined selecting condition. The first memory control step stores a collection of the voice data, which is determined to satisfy the predetermined selecting condition in the determination step, in the memory means as a piece of selected voice data. The voice output step outputs, when a game image showing a game character speaking is displayed on the display means, a sound effect representing a voice of the game character from the voice output means by using at least a portion of a plurality of pieces of the selected voice data.

According to a second aspect, in the first memory control step, the computer may store the plurality of pieces of the selected voice data in a first area (a selected voice buffer 42) of the memory means. At this time, the game program instructs the computer to further perform a second memory control step of selecting, in accordance with a predetermined reference, at least one piece of the selected voice data from among the plurality of pieces of the selected voice data, and storing the at least one piece of the selected voice data in a second area (a synthesized voice buffer 43) of the memory means. In the voice output step, the computer generates the sound effect by using at least a portion of the at least one piece of the selected voice data stored in the second area.

According to a third aspect, the notification step may be performed for a plurality of times. At this time, the game program instructs the computer to further perform a deletion step (step S47) of deleting, before the notification step is to be performed, a piece of voice data stored in the first area in a time period from when the notification step has been most recently performed to when the notification step is to be performed.

According to a fourth aspect, the game program may instruct the computer to further perform an end determination step (step S29) of determining, after the notification step is performed, whether or not an amount corresponding to the plurality of pieces of the selected voice data stored in the memory means is equal to or greater than a predetermined amount. At this time, the acquisition step finishes acquiring the voice data if it is determined in the end determination step that the amount corresponding to the plurality of pieces of the selected voice data stored in the memory means is equal to or greater than the predetermined amount.

According to a fifth aspect, the game program may instruct the computer to further perform an end determination step (step S37) of determining, after the notification step is performed, whether or not a predetermined number of pieces of voice data, each of which is determined not to satisfy the predetermined selecting condition in the determination step, are continuously acquired. At this time, the acquisition step finishes acquiring the voice data if it is determined in the end determination step that the predetermined number of pieces of voice data, each of which is determined not to satisfy the predetermined selecting condition in the determination step, are continuously acquired.

According to a sixth aspect, the predetermined selecting condition may indicate that a variable concerning a size of amplitude of the voice signal represented by the voice data having been acquired is equal to or greater than a predetermine value.

According to a seventh aspect, the predetermined selecting condition may indicate that a predetermined lower limit number of pieces of voice data, each having a variable, concerning a size of amplitude of the voice signal represented by the voice data having been acquired, which is equal to or greater than a predetermined value, are continuously acquired.

According to an eighth aspect, in the first memory control step, when a predetermined upper limit number of pieces of voice data, each having a variable, concerning a size of amplitude of the voice signal represented by the piece of voice data having been acquired, which is equal to or greater than a predetermined value, are continuously acquired, the computer may store the predetermined upper limit number of pieces of voice data in the memory means as the piece of selected voice data.

According to a ninth aspect, in the notification step, the computer may output a question for the player to either one of the display means or the voice output means.

The example embodiment presented herein may be provided as a game device having a function equivalent to that realized by executing the aforementioned game program.

According to the first aspect, the voice inputted by the player is acquired, and only the voice data satisfying a selecting condition is stored. Thereafter, by using the portion of the plurality of pieces of the selected voice data, the sound effect is outputted when the game image showing the game character speaking is displayed. Thus, it becomes possible to easily output a sound effect representing a speech voice of a player character. In addition, according to the first aspect, the voice data repeatedly acquired is processed in real-time, and only voice data which is necessary is to be stored, thereby making it possible to effectively use the memory means of the game device.

According to the second aspect, from among the plurality of pieces of the selected voice data having been stored, at least one piece of the selected voice data is further selected in accordance with the predetermined reference, thereby making it possible to generate voice data suitable to be used as the sound effect.

According to the third aspect, the plurality of pieces of the selected voice data stored in the first area are acquired from an input voice performed in accordance with one notification. Therefore, a memory area used as the first area can be reduced, thereby making it possible to effectively use the memory area of the memory means.

According to the fourth aspect, an acquisition of an input voice is stopped when the number of pieces of the selected voice data having been acquired is sufficient. Therefore, the player does not need to input the voice unnecessarily for a long period of time, thereby making it possible to reduce a load imposed on the player performing a task of inputting a voice.

According to the fifth aspect, an acquisition of an input voice is stopped when it is assumed that the player finishes inputting a voice, thereby making it possible to execute a subsequent process without giving the player an extra waiting time.

According to the sixth aspect, it becomes possible to eliminate voice data, which is not appropriate to be used for reproducing the sound effect (e.g., a voice signal having a small sound volume), so as not to be included in a piece of selected voice data.

According to the seventh aspect, it becomes possible to eliminate voice data, which is not appropriate to be used for reproducing the sound effect because a length of a voice signal represented by the voice data is too short, so as not to be included in a piece of selected voice data.

According to the eighth aspect, it is possible to store the piece of selected voice data such that a length of a voice signal represented by the piece of selected voice data is to be equal to or smaller than a predetermined length. Therefore, a voice represented by the piece of selected voice data can sound like a meaningless word. For example, in a case where a sound effect representing a fictional language spoken by a character is reproduced, a voice represented by a piece of selected voice data sounds like a meaningless word, thereby making it possible to allow the sound effect to be more naturally sounding.

According to the ninth aspect, the player is prompted to input a voice by answering a question which is displayed on a screen or outputted by audio, thereby making it possible to allow the player to input the voice without being aware of a troublesomeness caused by the task of inputting the voice. Furthermore, the player can freely answer the question. Thus, it is possible not to reduce an interest in the game as compared to a case where a game device determines a word to be inputted.

These and other features, aspects and advantages of the example embodiment presented herein will become more apparent from the following detailed description of the example embodiment when taken in conjunction with the accompanying drawings.

DESCRIPTION OF EXAMPLE EMBODIMENTS

Figure 1:
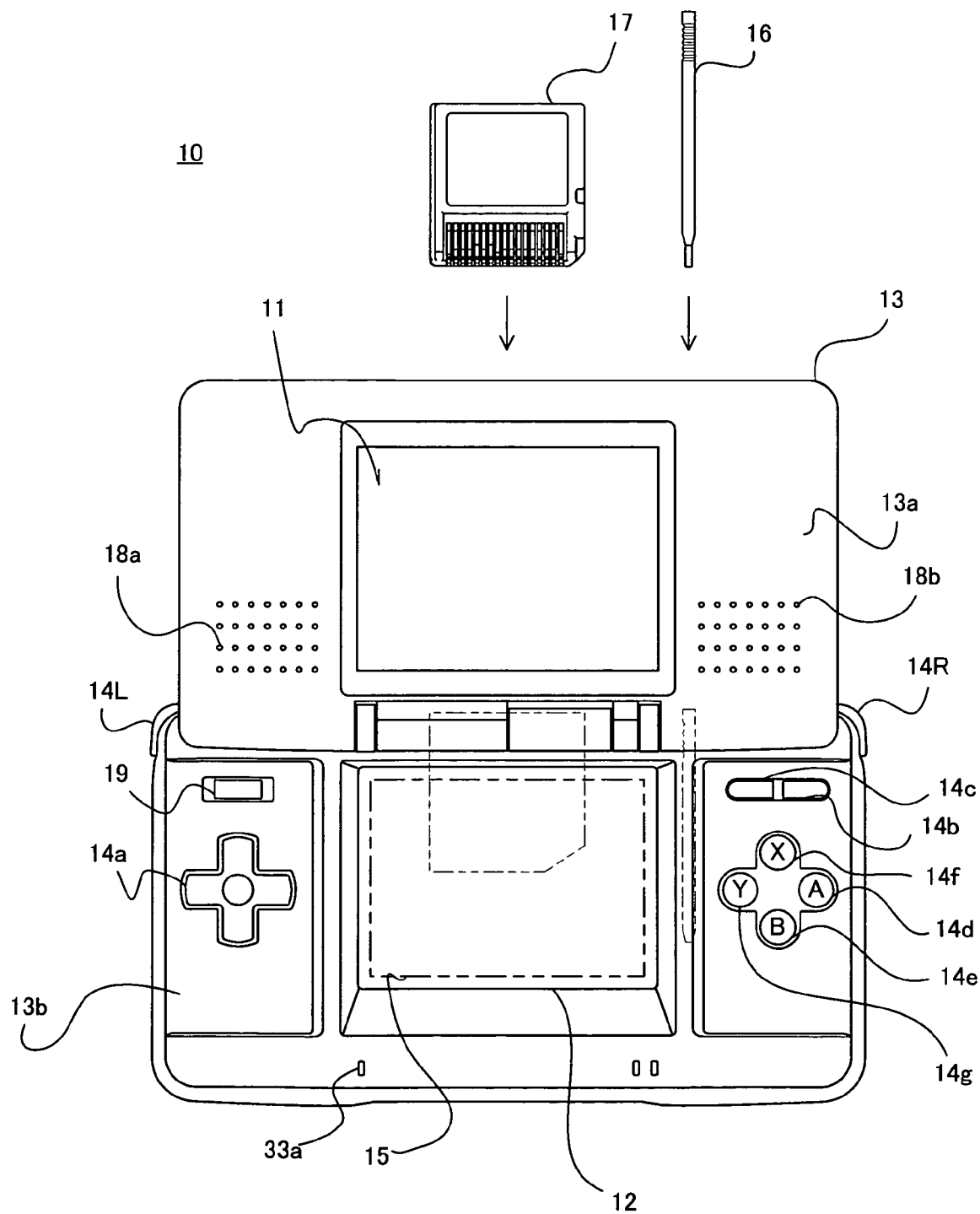
FIG. 1 is an external view of a game device according to an embodiment.

Hereinafter, a game device and a game program according to an embodiment will be described with reference to drawings. FIG. 1 is an external view of a game device 10. In FIG. 1, the game device 10 includes a first LCD (Liquid Crystal Display) 11 and a second LCD 12, a housing 13, an operation switch section 14, and a touch panel 15. Also, the game device 10 includes a right loudspeaker 30a and a left loudspeaker 30b (FIG. 2) as voice output means, and a microphone 33 (FIG. 2) as voice input means.

The housing 13 comprises an upper housing 13a and a lower housing 13b, and the first LCD 11 is accommodated in the upper housing 13a, and the second LCD 12 is accommodated in the lower housing 13b. Resolutions of the first LCD 11 and the second LCD 12 are both 256 dots×192 dots. Note that although a LCD is used as a display device in the present embodiment, any other display devices such as a display device using an EL (Electro Luminescence) may be used. Also, the resolution of the display device may be at any level.

The upper housing 13a is provided with sound holes 18a and 18b for outputting a sound from the pair of loudspeakers 30a and 30b to an exterior.

The lower housing 13b is provided with input devices as follows; a cross switch 14a, a start switch 14b, a select switch 14c, a start switch 14b, a select switch 14c, a "A" button 14d, a "B" button 14e, a "X" button 14f, a "Y" button 14g, a "L" button 14L, and a "R" button 14R. In addition, the touch panel 15 is provided on a screen of the second LCD 12 as another input device. The lower housing 13b is further provided with a sound hole 33a in a vicinity of the second LCD 12. The microphone 33, arranged inside the housing 13b and in the vicinity of the sound hole 33a, receives a sound external to the housing 13 through the sound hole 33a, and converts the sound into an electric signal (a voice signal). The lower housing 13b further includes a power switch 19, and insertion openings for storing a memory card 17 and a stick 16.

The touch panel 15 may be of any type such as a resistive film type, an optical type (infrared type), or a capacitive coupling type. The touch panel 15 has a function of outputting, when its surface is touched with the stick 16, coordinate data which corresponds to a touch position. Although the following description is provided on an assumption that a player uses the stick 16 to operate the touch panel 15, of course the touch panel 15 may also be operated by a pen (stylus pen) or a finger instead of the stick 16. In the present embodiment, the touch panel 15 having a resolution at 256 dots×192 dots (detection accuracy) as same as the second LCD 12 is used. However, resolutions of the touch panel 15 and the second LCD 12 may not necessarily be consistent with each other.

The memory card 17 is a storage medium having a game program stored therein, and placed in an insertion slot provided at the lower housing 13b in a removable manner.

Figure 2:
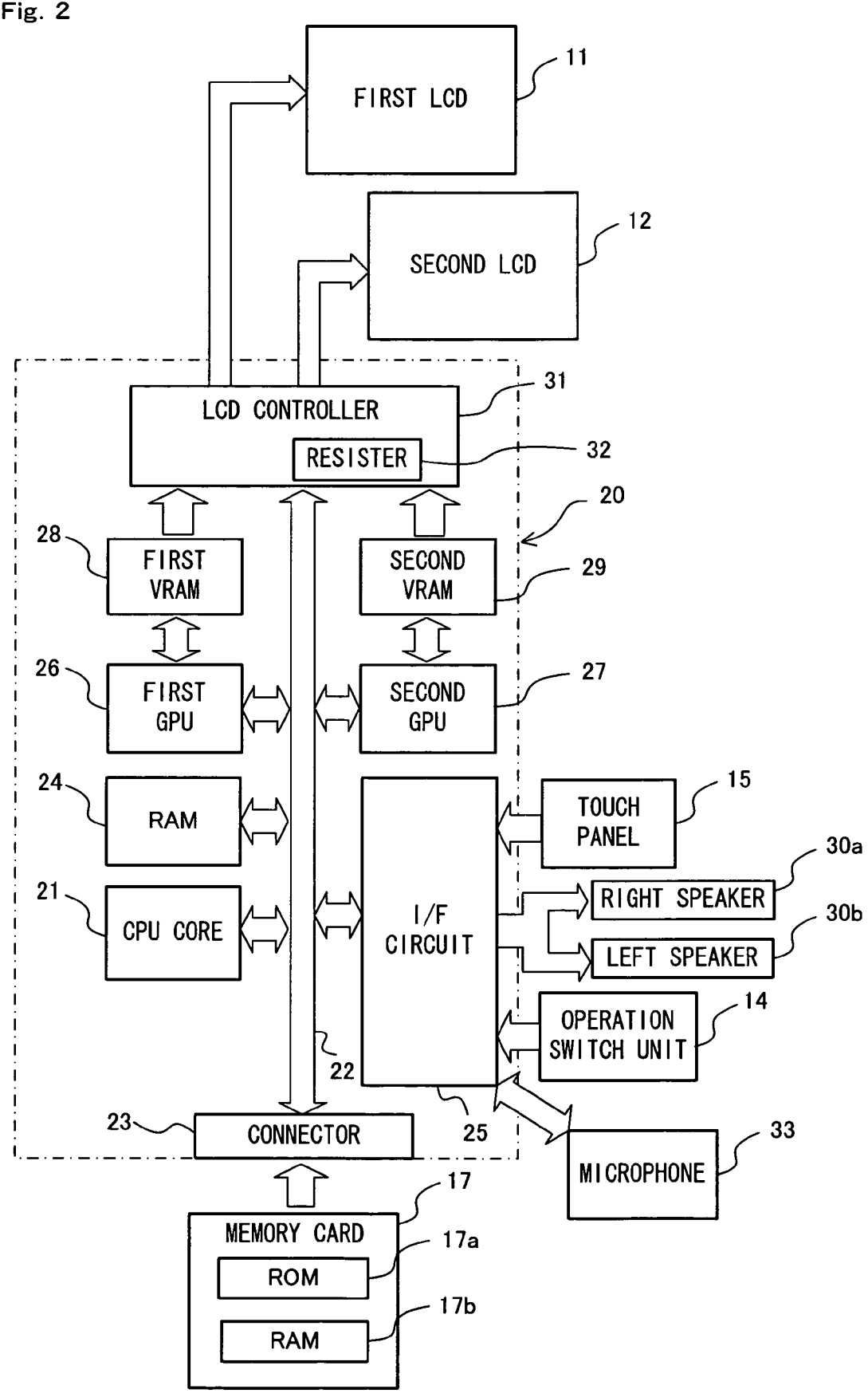
FIG. 2 is a view illustrating an internal configuration of the game device.

Next, an internal configuration of the game device 10 will be described with reference to FIG. 2. In FIG. 2, a CPU core 21 is mounted on an electronic circuit board 20 which is to be housed in the housing 13. Through a bus 22, the CPU core 21 is connected to a connector 23, an input/output interface circuit (shown as I/F circuit in the diagram) 25, a first GPU (Graphics Processing Unit) 26, a second GPU 27, a RAM 24, and a LCD controller 31. The memory card 17 is connected to the connector 23 in a removable manner. The memory card 17 includes a ROM 17a for storing a game program and a RAM 17b for storing backup data in a rewritable manner. The game program stored in the ROM 17a of the memory card 17 is loaded to the RAM 24 employed as memory means of the game device 10, and the game program having been loaded to the RAM 24 is executed by the CPU core 21. The RAM 24 stores, in addition to the game program, data such as temporary data which is acquired by the CPU core 21 executing the game program, and data for generating a game image.

To the I/F circuit 25 are connected, the operation switch section 14, the touch panel 15, the right loudspeaker 30a, the left loudspeaker 30b, and the microphone 33. The right loudspeaker 30a and the left loudspeaker 30b are arranged inside the sound holes 18a and 18b, respectively. When the game device 10 outputs a sound effect of the game, for example, the CPU core 21 outputs voice data (a sound source) stored in the RAM 24 from the I/F circuit 25 to the loudspeakers 30a and 30b via an A/D conversion circuit and an amplifier (not shown), thereby allowing the loudspeakers 30a and 30b to output a voice represented by the voice data. In addition, the voice data representing a voice inputted to the microphone 33 is stored in the RAM 24 via the I/F circuit 25.

A first VRAM (Video RAM) 28 is connected to the first GPU 26, and a second VRAM 29 is connected to the second GPU 27. In accordance with an instruction from the CPU core 21, the first GPU generates a first game image based on the image data which is stored in the RAM 24, and writes images into the first VRAM 28. The second GPU 27 also follows an instruction from the CPU core 21 to generate a second game image, and writes images into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 the first game image which has been written into the VRAM 28, and outputs to the second LCD 12 the second game image which has been written into the second VRAM 29. When the value of the register 32 is 1, the first game image which has been written into the first VRAM 28 is outputted to the LCD 12, and the second game image which has been written into the second VRAM 29 is outputted to the first LCD 11.

The configuration of the game device 10 as described above is merely an example. The example embodiment presented herein is applicable to any computer system comprising voice input means, voice output means, display means, and memory means. Furthermore, the game program of the example embodiment can be supplied to a computer system not only by way of an external storage medium such as a memory card 17, but also by way of a wired or wireless communication path. The program can also be recorded beforehand in a nonvolatile storage unit in an interior of a computer system.

Next, a process to be executed by the game device 10 in the present embodiment will be described. The present embodiment describes a game in which a voice of the player is used as a sound effect representing a speech voice of a character appearing in the game. Therefore, the voice of the player is used as the sound effect representing the speech voice of a player character operated by the player. Thus, the player can feel a sense of closeness to the player character. Note that it is assumed that the character speaks a fictional language used in a game world. Therefore, it is understood that the sound effect representing the speech voice of the character allows the player to feel as if the character spoke the fictional language.

Thus, the sound effect preferably sounds like a meaningless word, not a word which has a meaning.

In the present embodiment, the game device 10 prompts the player to input a voice before starting the game or at an appropriate time during the game, for example, thereby acquiring voice data generated based on the voice inputted by the player. Although details will be described later, the acquired voice data is stored in the RAM 24 in a format suitable to be used as the sound effect representing the speech voice of the character. Then, the stored voice data is outputted from the loudspeakers 30a and 30b when the character speaks during the game (i.e., when an image showing the character speaking is displayed on the first LCD 11 or the second LCD 12). Thus, it becomes possible to output the sound effect representing the speech voice of the character by using the voice inputted by the player. Hereinafter, a game process will be described mainly with respect to a process of storing voice data inputted by the player and a process of outputting a sound effect by using the stored voice data.

Figure 3:
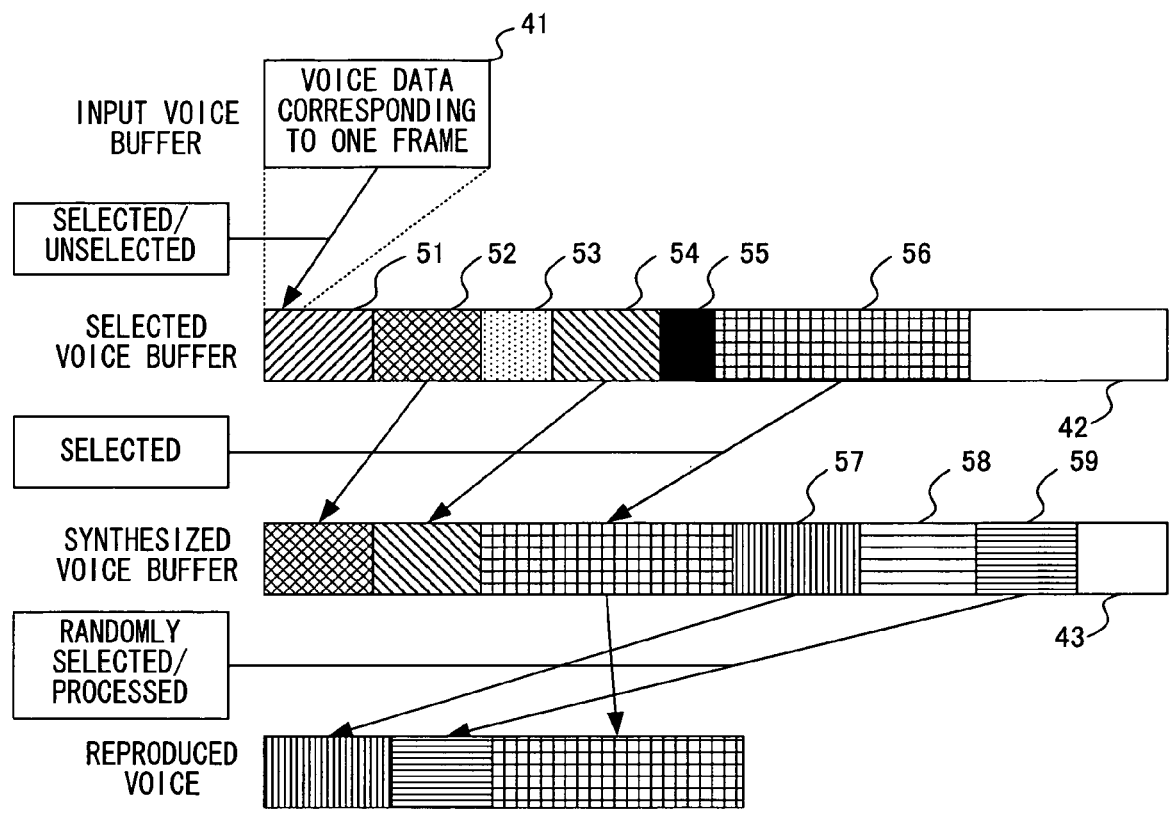
FIG. 3 is a view describing an outline of a game process executed in the present embodiment.
Figure 4:
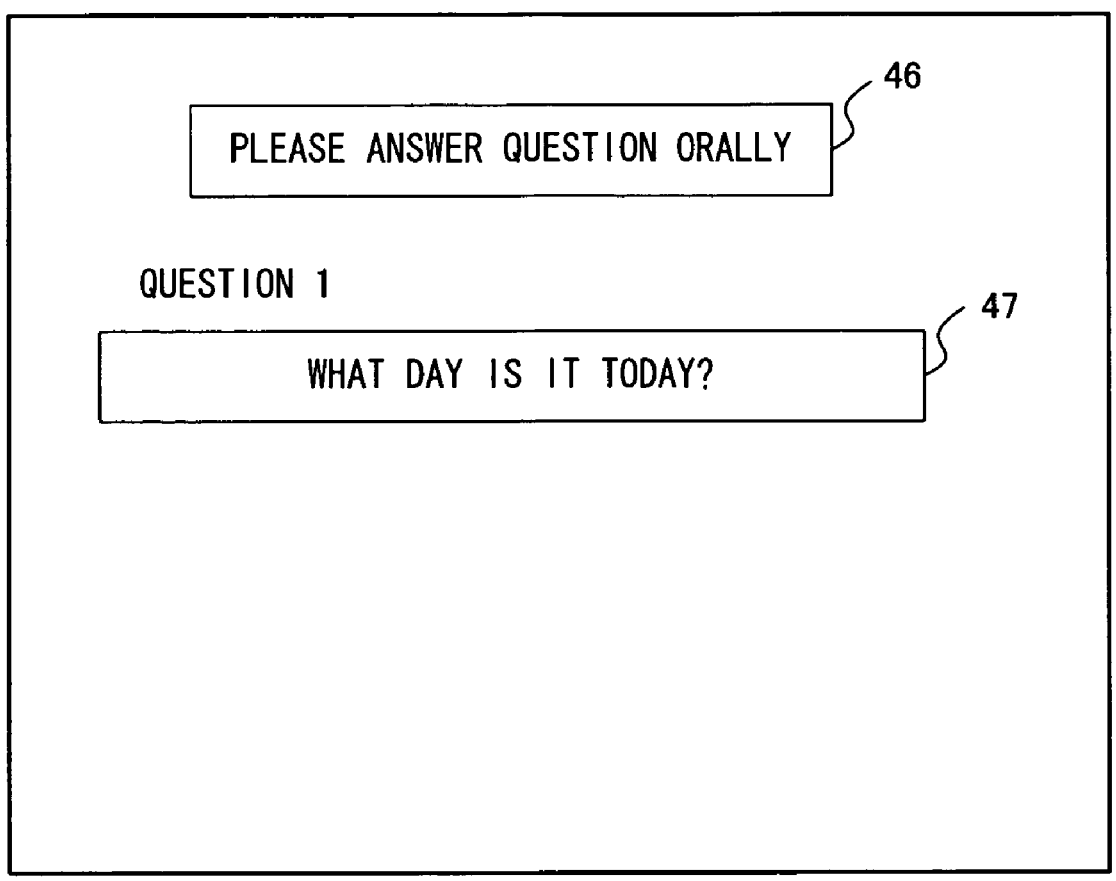
FIG. 4 is a view illustrating an example of a screen on which a question is displayed.

Firstly, an outline of the game process to be executed by the game device 10 will be described with reference to FIGS. 3 to 5. FIG. 3 is a view describing the outline of the game process according to the present embodiment. As shown in FIG. 3, three buffers (i.e., an input voice buffer 41, a selected voice buffer 42 and a synthesized voice buffer 43) for acquiring a voice inputted by the player and storing the acquired voice are included in the RAM 24 of the game device 10. The input voice buffer 41 is a memory area for storing voice data (i.e., input voice data) representing a voice, of the player, which is inputted to the microphone 33. Hereinafter, the voice data stored in the input voice buffer 41 is referred to as "input voice data". The selected voice buffer 42 is a memory area for only storing the input voice data satisfying predetermined conditions. Hereinafter, the input voice data stored in the selected voice buffer 42 is referred to as "selected voice data". The synthesized voice buffer 43 is a memory area for only storing selected voice data selected in accordance with a predetermined reference from among the selected voice data stored in the selected voice buffer 42. Hereinafter, the selected voice data stored in the synthesized voice buffer 43 is referred to as "synthesized voice data". In other words, the synthesized voice data indicates the selected voice data selected in accordance with the predetermined reference from among the selected voice data stored in the selected voice buffer 42.

In order to prompt the player to input a voice, the game device 10 issues a notification that the player is prompted to input a voice. In the present embodiment, the game device 10 displays, as the notification, a question for the player on the first LCD 11 or the second LCD 12. FIG. 4 is a view illustrating an example of a screen on which a question is displayed. As shown in FIG. 4, a text 46 indicating "please answer a question orally" and a question 47 indicating "what day is it today?" are displayed on the screen. Note that in the present embodiment, a plurality of questions are presented. In FIG. 4, "question 1" displayed above the question 47 indicates an initial question. When such a screen as shown in FIG. 4 is displayed, the player inputs a voice to the microphone 33 by answering the questions. As such, the game device 10 prompts the player to input the voice by answering the questions. Thus, the player can perform a task of inputting a voice without being aware of the task. For example, there may be a method of prompting the player to input 50 spoken syllables of the Japanese syllabary or 26 letters of the English alphabet one by one in order. With this method, however, the player may feel bothered to input the voices. Furthermore, in the present embodiment, the game device 10 displays a question on the screen so as to notify the player. In another embodiment, however, the game device 10 may output a question by audio. Still furthermore, in the present embodiment, the game device 10 prompts the player to input the voice by answering the questions. However, the present invention is not limited thereto. The game device 10 may instruct the player to input a voice of a predetermined word, for example.

Figure 8:
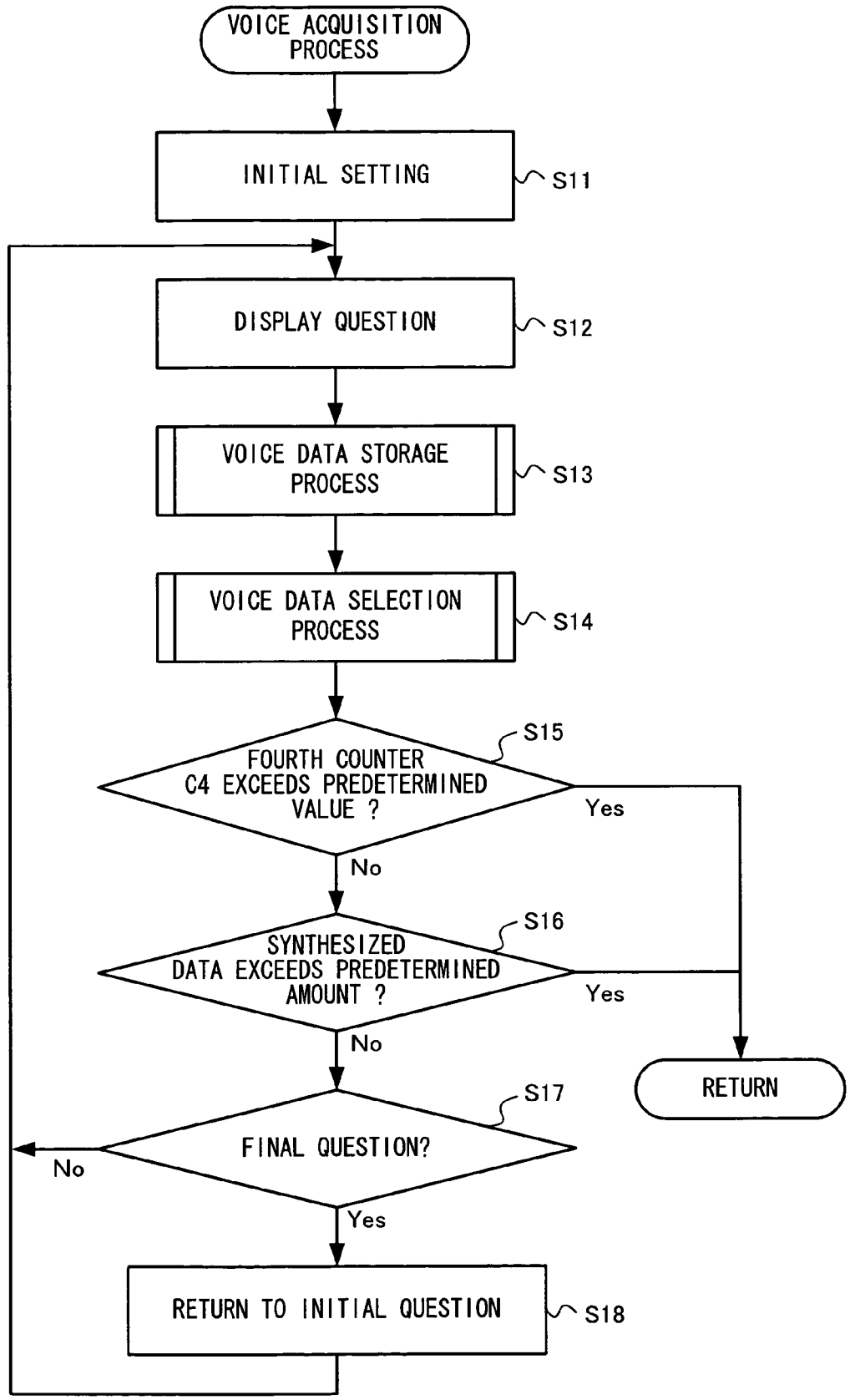
FIG. 8 is a flowchart illustrating details of a voice acquisition process of step S3 shown in FIG. 7.

Returning to the description of FIG. 3, after the notification is issued, the game device 10 executes a voice data storage process (see step S13 in FIG. 8). Firstly, in the voice data storage process, a voice input acquisition process is executed. Specifically, the game device 10 acquires a voice inputted to the microphone 33, and then the inputted voice is stored in the input voice buffer 41 as the input voice data. In the present embodiment, a size of the input voice buffer 41 is set so as to be capable of storing an amount of voice data corresponding to a voice signal having a predetermined time length. As shown in FIG. 3, the predetermined time length is one frame (1/60second), for example. Therefore, voice data corresponding to a voice signal having a length of one frame is stored in the input voice buffer 41. The voice data stored in the input voice buffer 41 is updated each time a voice signal having a predetermined length is acquired via the microphone 33. Hereinafter, the input voice data corresponding to one frame stored in the input voice buffer 41 is referred to "a piece of input voice data".

Next, in the voice data storage process, the game device 10 executes a selected voice data storage process. That is, when the voice input acquisition process is executed, thereby storing input voice data corresponding to one frame in the input voice buffer 41, the game device 10 stores, if the input voice data satisfies predetermined selecting conditions, the input voice data in the selected voice buffer 42 as the selected voice data. Specifically, the game device 10 determines whether or not the input voice data satisfies the aforementioned selecting conditions. Note that the selecting conditions determine whether or not input voice data is appropriate to be used as a sound effect representing a speech voice of the character. In the present embodiment, the selecting conditions indicate that the following conditions "a" and "b" are both satisfied.

(Condition "a"): a piece of input voice data has a portion in which amplitude (volume) thereof is equal to or greater than a threshold value V1.

(Condition "b"): a predetermined lower limit number (i.e., six in the present embodiment) of pieces of input voice data satisfying the condition "a" are continuously acquired.

Hereinafter, a detailed example obtained when the selecting conditions are applied to the input voice data will be described.

Figure 5:
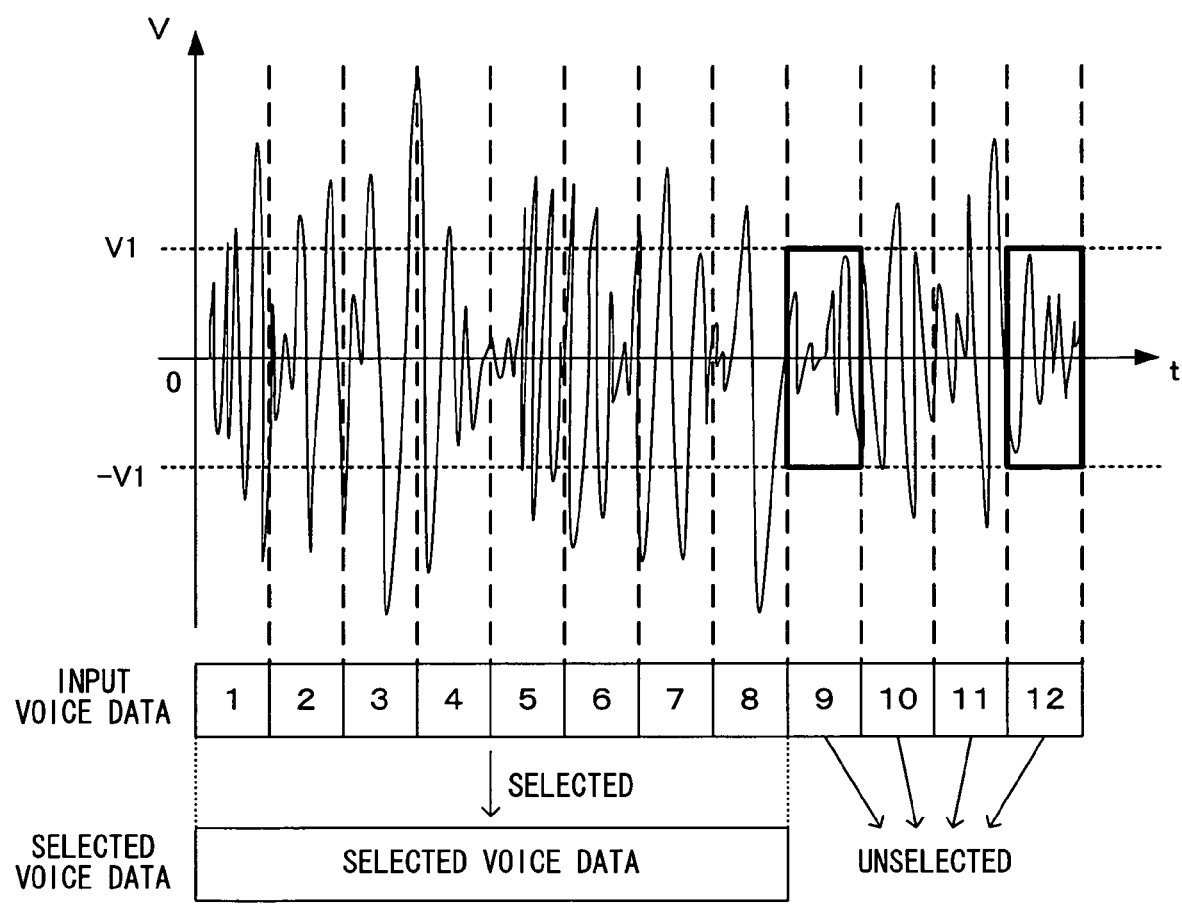
FIG. 5 is a view for describing selecting conditions.

FIG. 5 is a view for describing the selecting conditions. A graph shown in FIG. 5 indicates a waveform of a voice signal inputted by the player. In FIG. 5, the horizontal axis represents the time [t] and the vertical axis represents the amplitude [V]. Also, in FIG. 5, a block denoted by a number therein indicates a piece of input voice data, and the number indicates an order in which the piece of input voice data is acquired.

In FIG. 5, a first to eighth pieces of input voice data satisfy the selecting conditions. Therefore, the first to eighth pieces of input voice data are to be stored in the selected voice buffer 42 as the selected voice data. A ninth piece of input voice data does not satisfy the condition "a". Therefore, the ninth piece of input voice data is not to be selected. Although a tenth and an eleventh pieces of input voice data satisfy the condition "a", the tenth and the eleventh pieces of input voice data do not satisfy the condition "b" because a twelfth piece of input voice data does not satisfy the condition "a". Therefore, the tenth and the eleventh pieces of input voice data are not to be selected. The twelfth piece of input voice data is not to be selected because the data does not satisfy the condition "a".

In the present embodiment, the condition "a" relating to amplitude of a voice signal is used. In another embodiment, however, a condition relating to a variable concerning a size of the amplitude of the voice signal (including an amplitude value or an average amplitude value) may be used instead of the condition "a". In other words, if whether or not a volume of the voice signal indicated by the voice data is sufficient to reproduce a sound effect can be determined, any condition may be used. Instead of the condition "a", a condition in which an average amplitude value of a voice signal is equal to or greater than a predetermined value may be used, for example. Furthermore, in another embodiment, the selecting conditions may include at least a condition relating to a variable concerning a size of amplitude of a voice signal.

In another embodiment, the following condition "b'" may be used, instead of the condition "b" mentioned above.

(Condition "b'"): among the predetermined lower limit number of pieces of input voice data continuously acquired, the number of pieces of input voice data not satisfying the condition "a" is 0 or 1.

In an example of FIG. 5, the first to eleventh pieces of input voice data include only one piece of input voice data which does not satisfy the condition "a" (the ninth piece of input voice data). Thus, the first to eleventh pieces of input voice data satisfy the condition "b'". Therefore, the first to eleventh pieces of input voice data are to be selected as the selected voice data. If the condition "b" is used, thereby causing a length of a voice signal of the selected voice data to be too short, it is effective to use the condition "b'".

The input voice data which is determined to satisfy the above selecting conditions is to be stored in the selected voice buffer 42 as the selected voice data. In the present embodiment, a series of a plurality of pieces of input voice data which are determined to satisfy the condition "b" are referred to as "a piece of selected voice data". In the example of FIG. 5, the first to eighth pieces of input voice data are stored as a piece of selected voice data.

Furthermore, in the voice data storage process, when a predetermined upper limit number (i.e., 20 in the present embodiment) of pieces of input voice data satisfying the condition "a" are continuously acquired, the game device 10 stores the predetermined upper limit number of pieces of input voice data in the selected voice buffer 42 as a piece of selected voice data. That is, the game device 10 stores a piece of selected voice data in the selected voice buffer 42, such that a length of the piece of selected voice data is equal to or smaller than that of the upper limit number of pieces of input voice data. For example, when 30 pieces of input voice data satisfying the condition "a" are continuously acquired, the game device 10 stores the 20 pieces of input voice data which have been initially acquired as a piece of selected voice data, and further stores the remaining 10 pieces of input voice data which have been most recently acquired as another piece of selected voice data. Note that when a length of a piece of selected voice data becomes too long, a problem may occur in that the piece of selected voice data indicates a word which has a meaning (e.g., a single word). In the game world of the present embodiment, it is assumed that the character speaks the fictional language. Therefore, a word which has a meaning is not allowed to be included in the speech voice of the character. Thus, in the present embodiment, a piece of selected voice data is stored in the selected buffer 42, such that a length of the piece of selected voice data is prevented from becoming too long. Therefore, it becomes possible to allow a voice to be reproduced as a speech voice of a character to sound like a meaningless word.

In the voice data storage process, the game device 10 repeats the voice input acquisition process and the selected voice data storage process until a predetermined end condition is satisfied. The end condition determines whether or not an acquisition of a voice inputted for one question is to be finished. In the present embodiment, the end condition determines whether or not an amount corresponding to a plurality of pieces of the selected voice data having been acquired from a voice inputted for one question is sufficient, or whether or not it is determined that the player finishes inputting a voice for one question. Specifically, the end condition indicates that either of the following condition "c" or "d" is satisfied.

(Condition "c"): a predetermined number of pieces of selected voice data have been acquired from a voice inputted by the player for a current question.

(Condition "d"): in a state where at least one piece of selected voice data is stored in the selected voice buffer 42, a predetermined number (i.e., 45 in the present embodiment) of pieces of input voice data which do not satisfy the condition "a" are continuously acquired.

When the aforementioned end condition is satisfied, the game device 10 finishes the voice data storage process. In an example of FIG. 3, while the voice data storage process is executed once, six pieces of selected voice data 51 to 56 are stored in the selected voice buffer 42.

In another embodiment, instead of the condition "c", a condition, in which a total amount corresponding to a plurality of pieces of the selected voice data having been acquired from a voice inputted by the player for the current question reaches a predetermined data amount, may be used. Alternatively, in another embodiment, "in a state where at least one piece of selected voice data is stored in the selected voice buffer 42" may be eliminated from the condition "d" mentioned above.

When the voice data storage process is finished, the game device 10 executes a voice data selection process (see step S14 in FIG. 8). In the voice data selection process, at least one piece of voice data suitable for generating a sound effect is selected from among the plurality of pieces of the selected voice data having been stored in the selected voice buffer 42. A selected piece of voice data is to be stored in the synthesized voice buffer 43 as a piece of synthesized voice data. In the example of FIG. 3, from among the six pieces of selected voice data 51 to 56, three pieces of selected voice data 52, 54 and 56 are selected as three pieces of synthesized voice data. References for selecting at least one piece of synthesized voice data will be described later (see steps S41 to S45 in FIG. 10).

Upon selecting the at least one piece of synthesized voice data, the game device 10 determines whether or not an amount corresponding to the at least one piece of synthesized voice data having been acquired for generating a sound effect is sufficient. Note that when either of the following condition "e" or "f" is satisfied, the amount corresponding to the at least one piece of synthesized voice data having been acquired for generating the sound effect is sufficient.

(Condition "e"): the number of pieces of synthesized voice data stored in the synthesized voice buffer 43 is equal to or greater than a predetermined value.

(Condition "f"): an amount corresponding to the at least one piece of synthesized voice data stored in the synthesized voice buffer 43 is equal to or greater than a predetermined data amount. Note that in another embodiment, either one of the condition "e" or the condition "f" may be used.

Hereinafter, the present embodiment will be described under an assumption that a plurality of pieces of synthesized voice data is selected.

When it is determined that the amount corresponding to a plurality of pieces of synthesized voice data having been acquired is sufficient, the game device 10 finishes presenting a question. On the other hand, when it is determined that the amount corresponding to the plurality of pieces of synthesized voice data having been acquired is not sufficient, the game device 10 presents a next question, and then executes the voice data storage process and the voice data selection process. The game device 10 continues presenting a question until the amount corresponding to the plurality of pieces of synthesized voice data having been acquired is to be sufficient. Note that when all questions previously prepared have already been presented, the initial question will be presented again. In FIG. 3, in the voice data storage process and the voice data selection process both executed for a second and subsequent questions, three pieces of synthesized voice data 57 to 59 are additionally stored in the synthesized voice buffer 43.

Upon finishing presenting the questions, the game device 10 executes the game process so as to proceed with the game. Then, the game device 10 reproduces a sound effect representing a speech voice of a character when the character speaks during the game. When the sound effect is reproduced, the game device 10 selects, on a random basis, several pieces of the synthesized voice data from among the plurality of pieces of synthesized voice data stored in the synthesized voice buffer 43. In the example of FIG. 3, from among six pieces of synthesized voice data 52, 54, 56 to 59 stored in the synthesized voice buffer 43, three pieces of synthesized voice data 57, 59 and 56 are selected firstly, secondly and thirdly, respectively. Furthermore, the game device 10 selects a sequence used for reproducing each piece of the synthesized voice data. Thereafter, in accordance with the sequence, the game device 10 executes a process such as a modulation process on each piece of the selected synthesized voice data so as to be outputted as a voice. Note that as shown in FIG. 3, a voice to be reproduced comprises a plurality of pieces of synthesized voice data connected to each other. An order of reproducing the plurality of pieces of synthesized voice data is determined on a random basis, and the aforementioned order is irrelevant to an order in which the plurality of pieces of synthesized voice data are stored in the synthesized voice buffer 43. As such, the sound effect is to be reproduced by using a plurality of pieces of synthesized voice data.

As described above, in the present embodiment, the sound effect representing the speech voice of the character can be generated by using the voice inputted by the player. Furthermore, whether or not input voice data should be selected as the selected voice data is determined in real-time, and any of input voice data which is not to be selected is to be eliminated from the selected voice buffer 41, thereby making it possible to reduce a memory area of the selected voice buffer 41. As a result, it becomes possible to effectively use a memory of the game device 10.

Furthermore, in the present embodiment, a piece of selected voice data is stored such that a length of the piece of selected voice data is to be equal to or smaller than a length corresponding to 20 frames. Therefore, a voice included in a piece of synthesized voice data can be reproduced so as to sound like a meaningless word. Thus, according to the present embodiment, by using the voice inputted by the player, it becomes possible to easily generate the sound effect sounding as if the character of the game spoke the fictional language.

Figure 6:
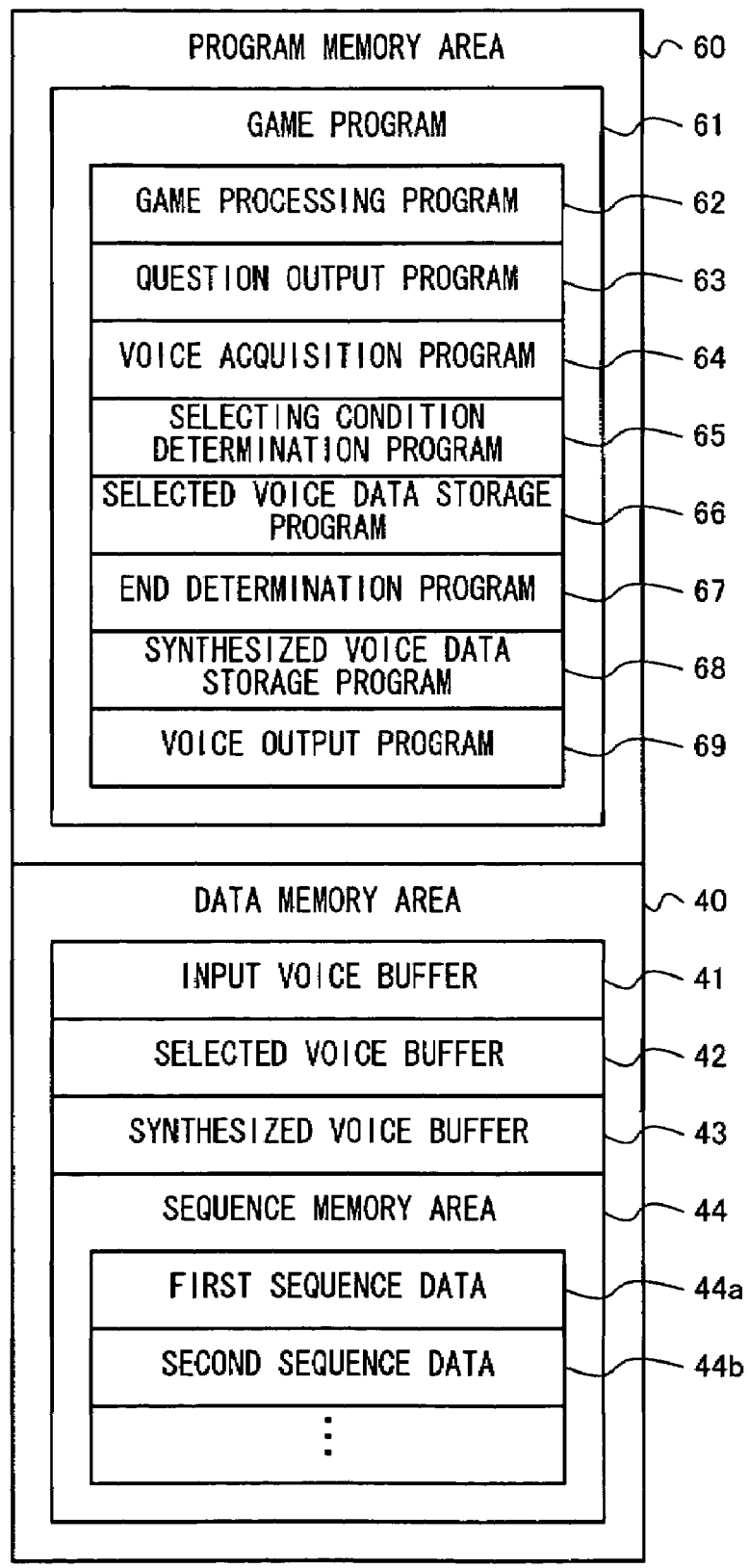
FIG. 6 is a view showing main data stored in a RAM 24 of the game device 10.

Next, the game process to be executed by the game device 10 will be described in detail. Firstly, main data used for the game process will be described with reference to FIG. 6. FIG. 6 is a view showing the main data stored in the RAM 24 of the game device 10. As shown in FIG. 6, a game program 61 is stored in a program memory area 60. The game program 61 includes a game processing program 62, a question output program 63, a voice acquisition program 64, a selecting condition determination program 65, a selected voice data storage program 66, an end determination program 67, a synthesized voice data storage program 68, and a voice output program 69.

Figure 7:
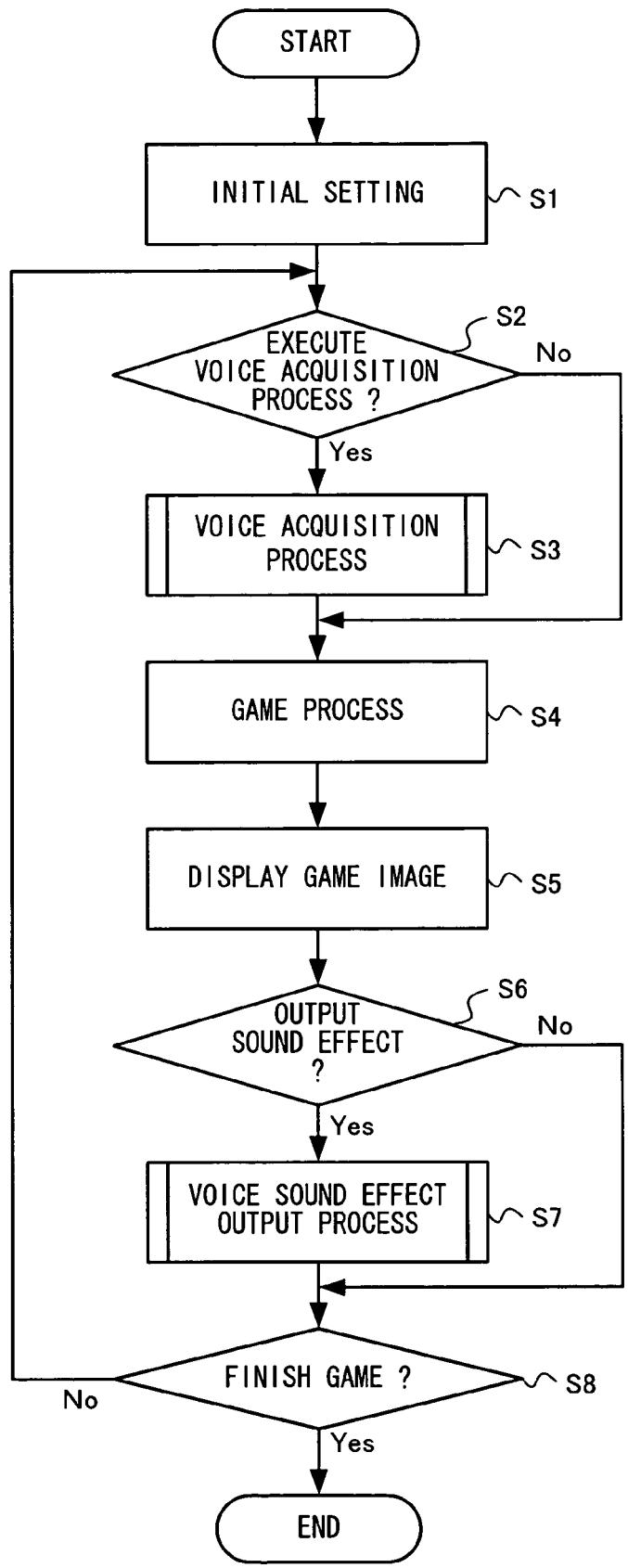
FIG. 7 is a flowchart illustrating a flow of a game process to be executed by the game device 10.

The game processing program 62 executes a predetermined game process (step S4 in FIG. 7). The question output program 63 outputs a question for prompting the player to input a voice (step S12 in FIG. 8). The voice acquisition program 64 repeatedly acquires, each time a voice signal having a predetermined time length is inputted to the microphone 33, voice data representing the voice signal having the predetermined time length (step S21 in FIG. 9). The selecting condition determination program 65 determines, each time the voice data is acquired by the voice acquisition program 64, whether or not the acquired voice data satisfies the aforementioned selecting conditions (steps S22 and S30 in FIG. 9). The selected voice data storage program 66 stores a collection of the acquired voice data determined to satisfy the selecting conditions in the selected voice buffer 42 as a piece of selected voice data (steps S27 and S32 in FIG. 9). The end determination program 67 determines whether or not the aforementioned end condition is satisfied (steps S29 and S37 in FIG. 9). The synthesized voice data storage program 68 selects, in accordance with predetermined references, at least one piece of the selected voice data from among a plurality of pieces of the selected voice data stored in the selected voice buffer 42, so as to be stored in the synthesized voice buffer 43 (step S14 in FIG. 8). The voice output program 69 outputs, when a game image showing a game character speaking is displayed, a sound effect representing a speech voice of the game character by using at least one piece of a plurality of pieces of synthesized voice data (step S7 in FIG. 7).

Furthermore, a data memory area 40 of the RAM 24 includes the input voice buffer 41, the selected voice buffer 42, the synthesized voice buffer 43, and the sequence memory area 44. Note that the RAM 24 stores, in addition to data shown in FIG. 6, data required to execute the game process, such as image data representing a character appearing in the game, data indicating a first to fifth counters to be described below, or the like.

The input voice buffer 41 stores the input voice data mentioned above. The selected voice buffer 42 stores the plurality of pieces of selected voice data mentioned above. The synthesized voice buffer 43 stores the plurality of pieces of synthesized voice data mentioned above. The sequence memory area 44 is a memory area for storing sequence data. The sequence memory area 44 stores at least one piece of sequence data (sequence data 44a and 44b in FIG. 6). The sequence data indicates a sequence used for reproducing each piece of the synthesized voice data.

Next, the game process to be executed by the game device 10 will be described in detail with reference to FIGS. 7 to 11. FIG. 7 is a flowchart illustrating a flow of the game process to be executed by the game device 10. When a power source of the game device 10 is turned on, the CPU core 21 of the game device 10 executes a start-up program stored in a boot ROM (not shown), thereby initializing the respective units such as the RAM 24. Thereafter, the game program stored in the memory card 17 is loaded to the RAM 24, and the game program having been loaded to the RAM 24 is executed by the CPU core 21. Note that the flowchart shown in FIG. 7 illustrates the flow of the game process to be executed after the aforementioned process is completed.

In step S1, an initial setting of the game process is executed. For example, a process of establishing a game space, and a process of setting initial values of various parameters provided for the character are executed. After step S1, the game is started. Then, steps S2 to S8 are executed, thereby causing the game device 10 to proceed with the game.

In step S2, the CPU core 21 determines whether or not the voice acquisition process of acquiring a voice of the player is to be executed. That is, it is determined whether or not the game device 10 is to start executing the voice acquisition process during the game. Note that the voice acquisition process may be executed at any time. For example, the voice acquisition process may be executed before starting the game, or when a predetermined condition is satisfied during the game. When it is determined in step S2 that the voice acquisition process is to be executed, step S3 is executed. On the other hand, when it is determined in step S2 that the voice acquisition process is not to be executed, step S3 is skipped, and step S4 is executed.

In step S3, the voice acquisition process is executed. In the voice acquisition process, the player is prompted to input a voice, thereby acquiring the voice. Hereinafter, the voice acquisition process will be described in detail with reference to FIG. 8.

FIG. 8 is a flowchart illustrating details of the voice acquisition process of step S3 shown in FIG. 7. In the voice acquisition process, in step S11, the CPU core 21 firstly executes an initial setting of the voice acquisition process. That is, values of the first to fifth counters $C1$ to $C5$ used in the voice acquisition process are initialized. Note that the first counter $C1$ indicates a length of voice data stored in the selected voice buffer 42. When the first counter $C1$ is "n", a length of the voice data stored in the selected voice buffer 42 corresponds to that of "n" pieces of input voice data. The second counter $C2$ indicates the number of pieces of selected voice data acquired from a voice inputted for one question. The third counter $C3$ indicates the number of pieces of input voice data, having been continuously acquired, which is determined not to have a voice inputted (i.e., which does not satisfy the condition "a"). The fourth counter $C4$ indicates the number of pieces of synthesized voice data stored in the synthesized voice buffer 43. The fifth counter $C5$ indicates a number assigned to a question to be subsequently outputted. Note that the plurality of questions which are previously prepared are numbered consecutively from 1. In step S11, each of the values of the first counter $C1$ to the fourth counter $C4$ is set to be "0". Also, the value of the fifth counter $C5$ is set to be "1".

In step S12, the CPU core 21 executes the question output program 63, thereby displaying a question on the first LCD 11 or the second LCD 12. The question to be displayed is a question to which a number indicated by the fifth counter $C5$ is assigned. When a question is displayed, the player orally inputs an answer to the question to the microphone 33. Note that the player may input his or her own voice, or may input a voice of a musical instrument, for example. After the question is displayed, the value of the fifth counter $C5$ is incremented (by one). Also, the value of the second counter $C2$ is re-set to be "0".

In step S13, the voice data storage process is executed. The voice data storage process stores of voice data representing the voice inputted by the player in the buffer of the RAM 24. Hereinafter, the voice data storage process will be described in detail with reference to FIG. 9.

Figure 9:
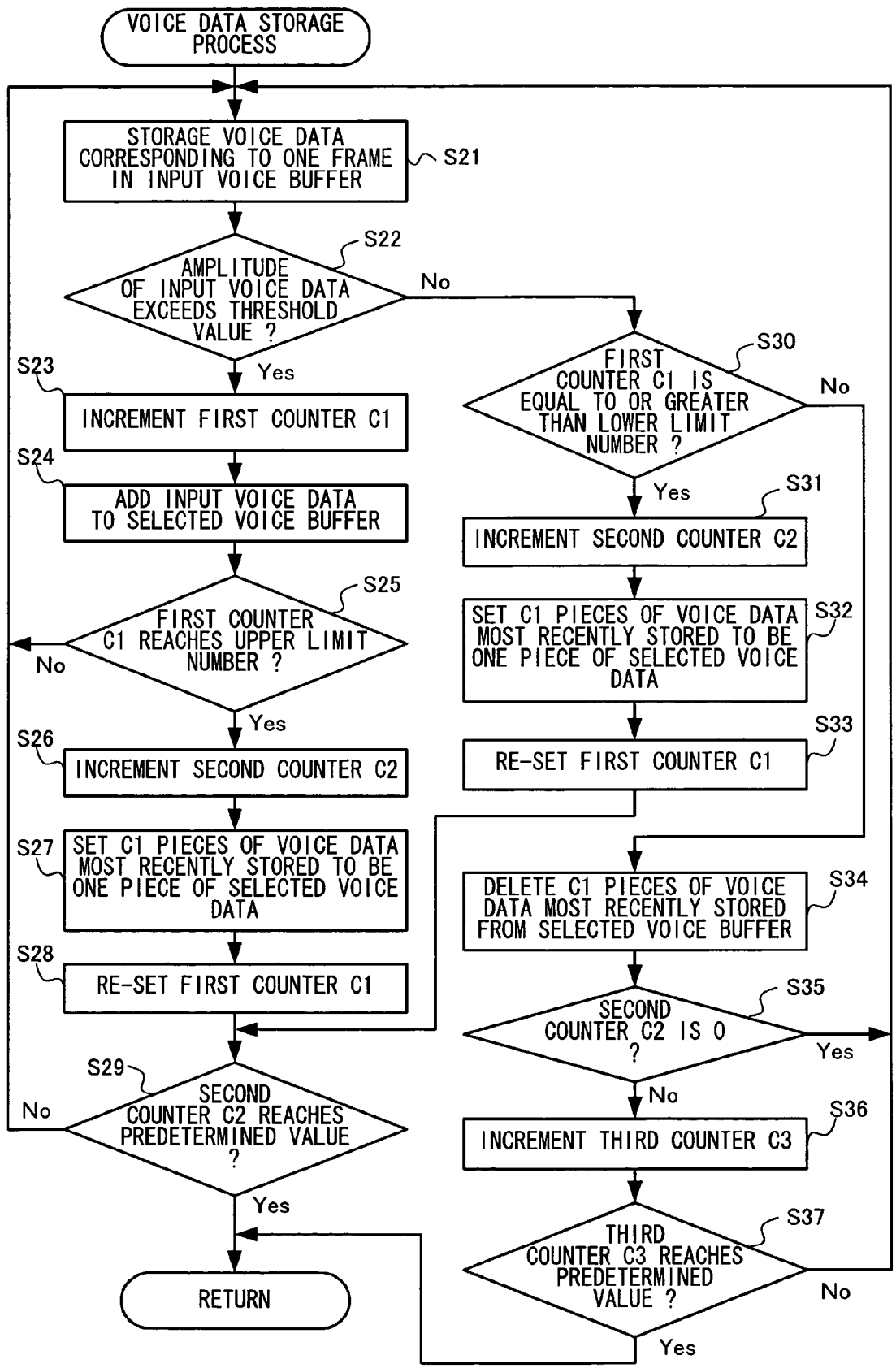
FIG. 9 is a flowchart illustrating details of a voice data storage process of step S13 shown in FIG. 8.

FIG. 9 is a flowchart illustrating details of the voice data storage process of step S13 shown in FIG. 8. In the voice data storage process, in step S21, the CPU core 21 firstly executes the voice acquisition program 64, thereby acquiring voice data corresponding to a voice signal, having a length of one frame, which is inputted to the microphone 33. Specifically, the voice data is stored in the input voice buffer 41. Note that, in step S21, each time a piece of voice data is newly acquired in a current frame, another piece of voice data having been acquired in a frame preceding the current frame is repeatedly overwritten with the piece of voice data newly acquired in the current frame, so as to be stored in the input voice buffer 41.

In step S22, the CPU core 21 executes the selecting condition determination program 65, thereby determining whether or not the input voice data acquired in step S21 satisfies the above condition "a". In other words, it is determined whether or not the input voice data has a portion in which amplitude (volume) thereof is equal to or greater than the threshold value $V1$. When it is determined that the input voice data satisfies the condition "a", step S23 is executed. On the other hand, when it is determined that the input voice data does not satisfy the condition "a", step S30 is executed. Note that step S30 will be described later.

In step S23, the CPU core 21 increments the first counter $C1$. In step S24, the CPU core 21 additionally stores the input voice data in the selected voice buffer 42. By executing steps S23 and S24, input voice data satisfying the condition "a" is stored in the selected voice buffer 42, and the number of pieces of stored inputted data is accordingly counted. Note that in step S24, even if input voice data is stored in the selected voice buffer 42, the stored input voice data is only temporarily stored in order to simplify the voice data storage process, and is not yet determined to be selected as the selected voice data. That is, even if input voice data is stored in the selected voice buffer 42 in step S24, the stored input voice data may be deleted in step S34 to be described later.

In step S25, the CPU core 21 determines whether or not the first counter $C1$ has reached the upper limit number (=20). In other words, in step S25, it is determined whether or not the upper limit number of pieces of input voice data satisfying the above condition "a" have been continuously acquired. When it is determined that the first counter $C1$ has reached the upper limit number, step S26 is executed. On the other hand, when it is determined that the first counter $C1$ has not yet reached the upper limit number, step S21 is executed again.

In step S26, the second counter $C2$ is incremented. At this time, the value of the third counter $C3$ is re-set to be "0". In step S27, the CPU core 21 executes the selected voice data storage program 66, thereby setting $C1$ pieces (i.e., the number equivalent to the value of the counter $C1$) of input voice data, which have been most recently stored in the selected voice buffer 42, to be a piece of selected voice data. That is, in step S27, a piece of selected voice data is determined to be selected and stored. In step S28, the value of the first counter $C1$ is re-set to be "0".

In step S29, the CPU core 21 executes the end determination program 67, thereby determining whether or not the above condition "c" is satisfied. In other words, in step S29, whether or not the predetermined number of pieces of selected voice data have been acquired from a voice inputted for a current question (step S12). Specifically, the determination can be made as to whether or not the second counter $C2$ indicates a number equivalent to the predetermined value. When it is determined that the condition "c" is satisfied (i.e., when the second counter $C2$ has reached a number equivalent to the predetermined value), the CPU core 21 finishes the voice data storage process. On the other hand, when it is determined that the condition "c" is not satisfied (i.e., when the second counter C2 has not yet reached a number equivalent to the predetermined value), step S21 is executed again.

Alternatively, in step S30, the CPU core 21 executes the selecting condition determination program 65, thereby determining whether or not input voice data acquired in step S21 satisfies the above condition "b". In other words, in step 30, it is determined whether or not the lower limit number of pieces of input voice data satisfying the condition "a" have been continuously acquired. Specifically, the determination in step S30 can be made by referring to the value of the first counter C1. That is, when the first counter C1 indicates a number equal to or greater than the lower limit number (=6), it is determined that the condition "b" is satisfied. On the other hand, when the first counter C1 indicates a number smaller than the lower limit number, it is determined that the condition "b" is not satisfied. When it is determined that the input voice data satisfies the condition "b", step S31 is executed. On the other hand, when it is determined that the input voice data does not satisfy the condition "b", step S34 is executed. Note that step S34 will be described later.

Similarly to steps S26 to S28, in steps S31 to S33, the voice data temporarily stored in step S24 is determined to be selected as the selected voice data. Specifically, in step S31, the second counter C2 is incremented. At this time, the value of the third counter C3 is re-set to be "0". In step S32, the CPU core executes the selected voice data storage program 66, thereby setting C1 pieces of input voice data, which have been most recently stored in the selected voice buffer 42, to be a piece of selected voice data. That is, in step S32, a piece of selected voice data is determined to be selected and stored. In step S33, the value of the first counter C1 is re-set to be "0".

On the other hand, in step S34, the CPU core 21 deletes C1 pieces of input voice data which have been most recently stored in the selected voice buffer 42. This is because the C1 pieces of input voice data do not satisfy the above condition "b", and thus these pieces of data are not to be stored in the selected voice buffer 42. That is, in step S34, if the number of pieces of input voice data temporarily stored in the selected voice buffer 42 in step S24 is smaller than the lower limit number, the input voice data is to be deleted. Note that when the first counter C1 indicates "0", no input voice data is to be deleted from the selected voice buffer 42.

In step S35, the CPU core 21 determines whether or not the second counter C2 indicates "0". In other words, in step S35, it is determined whether or not at least one piece of selected voice data has been stored in the selected voice buffer 42 while the current question is presented. That is, when the second counter C2 indicates "0", no selected voice data has not yet stored in the selected voice buffer 42 while the current question is presented. When it is determined that the second counter C2 indicates "0", step S21 is executed again. On the other hand, when it is determined that the second counter C2 does not indicate "0", step S36 is executed.

In step S36, the third counter C3 is incremented. In step S37, the CPU core 21 executes the end determination program 67, thereby determining whether or not the third counter C3 has reached a predetermined value. In other words, in step S37, it is determined whether or not the above condition "d" is satisfied. When it is determined that the third counter C3 has reached the predetermined value (i.e., when the above condition "d" is satisfied), the CPU core 21 finishes the voice data storage process. On the other hand, when it is determined that the third counter C3 has not yet reached the predetermined value, step S21 is executed again.

By executing the voice data storage process described above, input voice data which is repeatedly acquired can be processed in real-time. That is, each time the input voice data corresponding to one frame is acquired (step S21), it is determined whether or not the input voice data satisfies the condition "a" (step S22). Upon satisfying the condition "a", the input voice data is temporarily stored in the selected voice buffer (step S24). Then, as long as input voice data satisfying the condition "a" is continuously acquired, the input voice data is also to be temporarily stored in the selected voice buffer. Thereafter, when input voice data which does not satisfy the condition "a" is acquired (No in step S22), it is determined whether or not the condition "b" is satisfied (step S30). When the condition "b" is satisfied, the input voice data having been temporarily stored in the selected voice buffer is stored as a piece of selected voice data (step S32). Alternatively, if input voice data satisfying the condition "a" is continuously acquired, and then the number of pieces of input voice data having been continuously acquired has reached the upper limit number (Yes in step S25), the input voice data having been continuously acquired are stored as a piece of selected voice data (step S27). By executing the aforementioned process, input voice data which is repeatedly acquired can be processed in real-time. Thus, it becomes possible to store only input voice data suitable to be selected as a portion of the selected voice data.

Furthermore, the CPU core 21 determines whether or not the end condition is satisfied in step S29 and step S37. Specifically, whether or not the above condition "c" is satisfied in step S29, and whether or not the above condition "d" is satisfied in step S37. Thus, it becomes possible to allow the game device 10 to smoothly proceed with the task of inputting a voice by prompting the player to answer questions without giving an extra waiting time to the player answering the questions.

Returning to the description of FIG. 8, in step S14 followed by step S13, the CPU core 21 executes the synthesized voice data storage program 68, thereby executing a voice data selection process. In the voice data selection process, from among a plurality of pieces of the selected voice data stored in the selected voice buffer 42, at least one piece of the selected voice data more suitable to be used for a sound effect is selected. Hereinafter, the voice data selection process will be described in detail with reference to FIG. 10. Note that in the voice data selection process to be described later, it is assumed that a plurality of pieces of selected voice data are selected.

Figure 10:
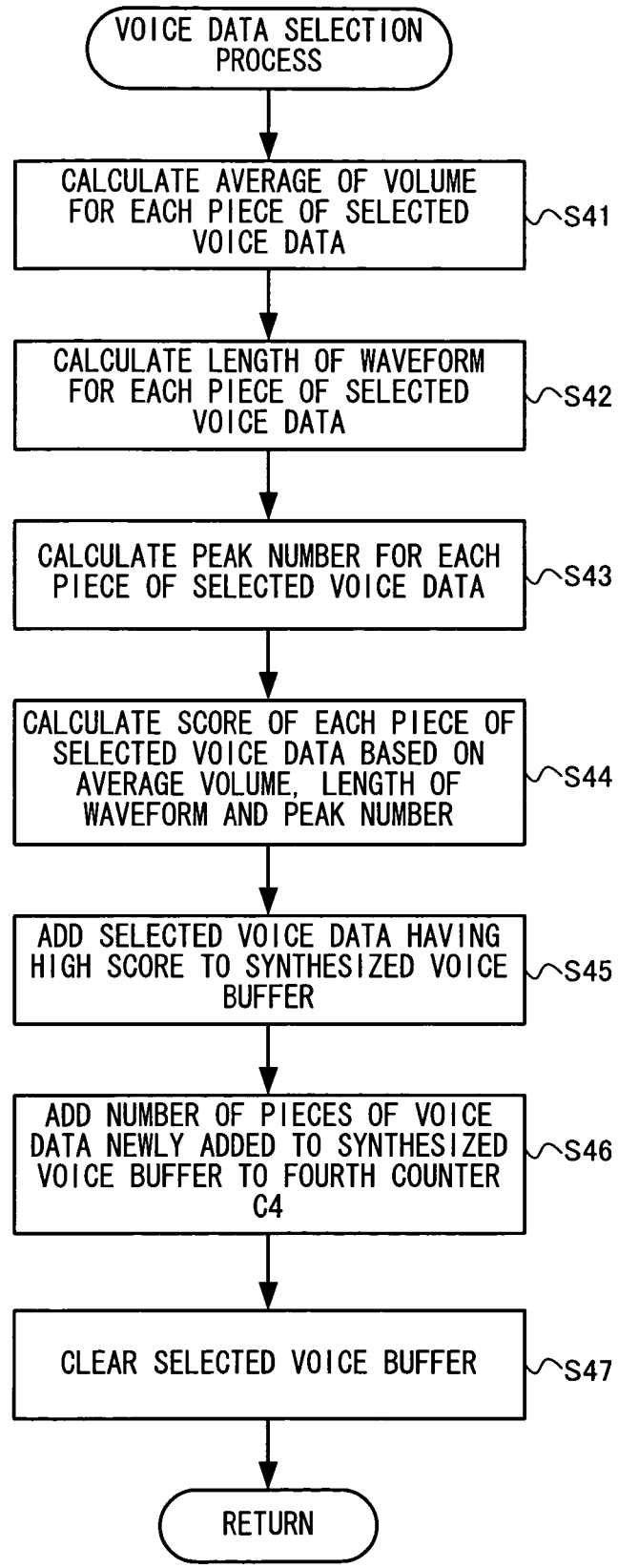
FIG. 10 is a flowchart illustrating details of a voice data selection process of step S14 shown in FIG. 8.

FIG. 10 is a flowchart illustrating details of the voice data selection process of step S14 shown in FIG. 8. In the voice data selection process, in step S41, the CPU core 21 firstly calculates an average value of amplitude (volume) for each piece of the selected voice data stored in the selected voice buffer 42. In step S42, a length of a voice waveform is calculated for each piece of the selected voice data. In step S43, the number of times at which a voice signal reaches a peak value (a peak number) is calculated for each piece of the selected voice data. In steps S41 to S43, information indicating a characteristic of a voice signal of each piece of the selected voice data is calculated.

In step S44, the CPU core 21 calculates a score of each piece of the selected voice data based on the information having been calculated in steps S41 to S43. Only if a score of each piece of the selected voice data is calculated so as to be higher in proportion to a value calculated in steps S41 to S43, any method may be used for calculating the score.

In step S45, the CPU core 21 selects at least one piece of the selected voice data from among the plurality of pieces of the selected voice data, so as to be stored in the synthesized voice buffer 43. Specifically, three pieces of selected voice data having the three highest scores calculated in step S44 are selected to be stored in the synthesized voice buffer 43. That is, the three pieces of selected voice data having the three highest scores are stored in the synthesized voice buffer 43 as the synthesized voice data. Note that in the case where the number of pieces of selected voice data stored in the selected voice buffer 42 is three or less, all pieces of selected voice data are selected.

In the present embodiment, three pieces of selected voice data having the three highest scores are selected in step S45. However, any number of pieces of selected voice data may be selected. In another embodiment, the CPU core 21 may select only selected voice data having a score higher than a predetermined value. Furthermore, in the present embodiment, as references for selecting the synthesized voice data, the three pieces of information such as an average value of the amplitude, a length of a voice waveform and a peak number are used, and a score is calculated based on the three pieces of information. In another embodiment, a score may be calculated based on at least one of the aforementioned three pieces of information, or based on a variable calculated by using information other than the three pieces of information.

In step S46, the CPU core 21 adds the number of pieces of voice data newly stored in the synthesized voice buffer 43 to the value of the fourth counter C4. As a result, the value of the fourth counter C4 indicates the number of pieces of synthesized voice data stored in the synthesized voice buffer 43. In step S47, the CPU core 21 clears the selected voice buffer 42. As such, the selected voice buffer 42 is cleared each time a process of acquiring voice data inputted for one question is finished. Therefore, a memory area required for the selected voice buffer 42 can be reduced, thereby making it possible to effectively use a memory. After step S47, the CPU core 21 finishes the voice data selection process.

Returning to the description of FIG. 8, in steps S15 and S16, it is determined whether or not an amount corresponding to at least one piece of synthesized voice data having been acquired for generating a sound effect is sufficient. In other words, in step S15, it is determined whether or not the above condition "e" is satisfied. Specifically, the CPU core 21 determines whether or not the number of pieces of synthesized voice data stored in the synthesized voice buffer 43 is equal or greater than a predetermined value. This determination can be made by referring to the value of the fourth counter C4. That is, when the value of the fourth counter C4 is equal to or greater than the predetermined value, it can be determined that the number of pieces of synthesized voice data has reached or exceeded the predetermined value. On the contrary, when the value of the fourth counter C4 is equal to or greater than the predetermined value, it can be determined that the number of pieces of synthesized voice data has not yet reached or exceeded the predetermined value. In step S14, when it is determined that the number of pieces of synthesized voice data has reached or exceeded the predetermined value, the CPU core 21 finishes the voice acquisition process. On the other hand, when it is determined that the number of pieces of synthesized voice data has not yet reached or exceeded the predetermined value, step S16 is executed.

In step S16, it is determined whether or not the above condition "f" is satisfied. Specifically, the CPU core 21 determines whether or not a total amount corresponding to the at least one piece of synthesized voice data stored in the synthesized voice buffer 43 is equal to or greater than a predetermined amount. When it is determined that the total amount corresponding to the at least one piece of synthesized voice data has reached or exceeded the predetermined amount, the CPU core 21 finishes the voice acquisition process. On the other hand, when it is determined that the total amount corresponding to the at least one piece of synthesized voice data has not yet reached or exceeded the predetermined amount, step S17 is executed.

In step S17, the CPU core 21 determines whether or not the current question is a final question. That is, it is determined whether or not a number of a question displayed in step S12 is a final number. This determination can be made by referring to the value of the fifth counter. In step S17, when it is determined that the current question is the final question, step 18 is executed. On the other hand, when it is determined that the current question is not the final question, step S12 is executed again.

In step S18, the CPU core 21 sets the initial question to be subsequently presented. Specifically, the value of the fifth counter is set to be "1", thereby, in step S12 to be subsequently executed, displaying a question to which a question number "1" is assigned (i.e., the initial question). After step S18, step S12 is executed again. This is the end of the description of the voice acquisition process.

Returning to the description of FIG. 7, in step S4 followed by step S3, the CPU core 21 executes the game processing program 62, thereby executing the game process. Specifically, the CPU core 21 executes, for example, a process of moving the character in the game space in accordance with an operation performed via the touch panel 15 or/and the operation switch section 14. In step S5, based on a result of the game process executed in step S4, the CPU core 21 displays a game image on the first LCD 11 and the second LCD 12. Step S4 and step S5 are repeated, thereby causing the game device 10 to proceed with the game.

In step S6, the CPU core 21 determines whether or not the sound effect representing the speech voice of the character is to be outputted. The aforementioned sound effect is outputted when a scene in which the character has a conversation is started, for example. In step S6, when it is determined that the sound effect is to be outputted, step S7 is executed. On the other hand, when it is determined that the sound effect is not yet to be outputted, step S7 is skipped, and step S8 is executed.

In step S7, the CPU core 21 executes the voice output program 69, thereby executing a voice sound effect output process. In the voice sound effect output process, the sound effect is outputted by using the plurality of pieces of synthesized voice data. Hereinafter, the voice sound effect output process will be described in detail with reference to FIG. 11.

Figure 11:
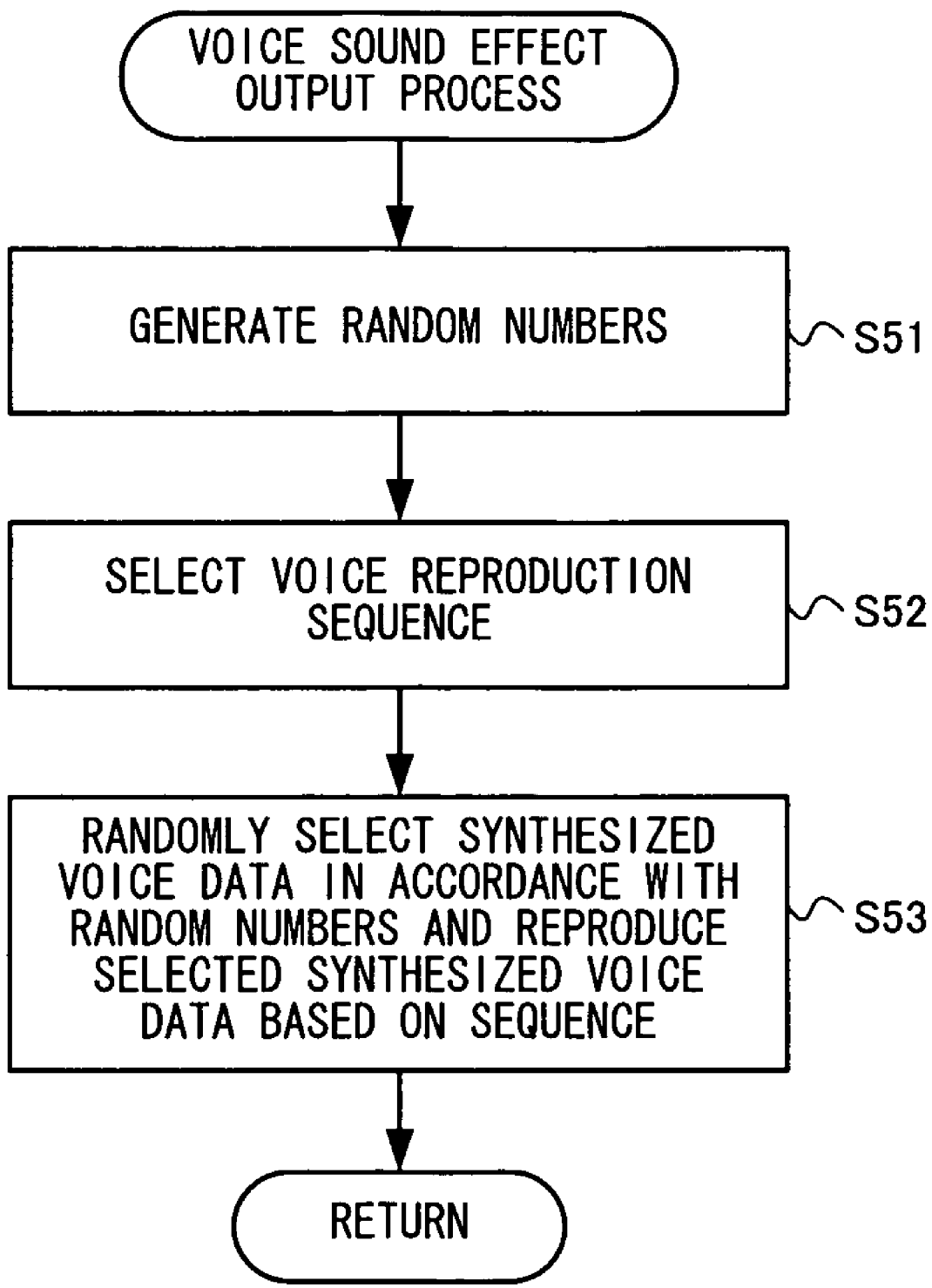
FIG. 11 is a flowchart illustrating details of a voice sound effect output process of step S7 shown in FIG. 7.

FIG. 11 is a flowchart illustrating details of the voice sound effect output process of step S7 shown in FIG. 7. Note that in FIG. 11, it is assumed that a plurality of synthesized voice data are selected. In the voice sound effect output process, in step S51, the CPU core 21 firstly generates random numbers. The random numbers generated in step S51 will be used in step S53 to be described later.

In step S52, a voice reproduction sequence of reproducing each piece of the synthesized voice data is selected. Specifically, the CPU core 21 selects one of the sequence data stored in the sequence memory area 44 of the RAM 24. Note that sequence data to be selected may be determined based on a game situation, or based on contents of each of the plurality of pieces of synthesized voice data.

In step S53, the CPU core 21 selects, on a random basis, several pieces of the synthesized voice data from among a plurality of pieces of the synthesized voice data stored in the synthesized voice buffer 43, based on the random numbers, and performs a processing on each piece of the selected synthesized voice data based on the voice reproduction sequence. Then, the CPU core 21 reproduces each piece of selected the synthesized voice data in which the processing has been performed. Note that the processing to be executed may include various processes. For example, the processing includes a process of modulating each piece of voice data, a process of performing a fade-in/fade-out operation for each piece of voice data, a process of selecting voice data whose amplitude value of a voice signal is small and multiplying the amplitude value by a predetermined number, and the like. By executing step S53, it becomes possible to reproduce the sound effect sounding as if the character spoke the fictional language. After step S53, the CPU core 21 finishes the voice sound effect outputting process. After the voice sound effect output process, step S8 shown in FIG. 7 is executed.

Returning to the description of FIG. 7, in step S8, the CPU core 21 determines whether or not the game is to be finished. Specifically, whether or not the game is cleared, it is determined whether or not the game is over, or whether or not an instruction to finish the game is issued by the player. When it is determined that the game is not yet to be finished, step S2 is executed again. Thereafter, steps S2 to S8 will be repeated until the game is finished. On the other hand, when it is determined that the game is to be finished, the CPU core 21 finishes the flow of the game process shown in FIG. 7.

As described above, according to the present embodiment, the game device 10 prompts the player to answer questions, thereby making it possible to easily generate a sound effect, representing a speech voice of a player character, which is generated by using a voice of the player. That is, the sound effect sounding as if the player character spoke a fictional language can be generated without causing the player to perform a troublesome task of inputting a voice.

A feature of the example embodiment presented herein is to easily generate a sound effect used in a game by using a voice inputted by a player. The present embodiment is applicable to a game program and a game device, for example.

While the example embodiment has been described in detail, the foregoing description is in all aspects illustrative and not restrictive. It is understood that numerous other modifications and variations can be devised without departing from the scope of the example embodiment.

What is claimed is:

1. A non-transitory computer-readable storage medium storing a game program to be executed by a computer of a game device including a voice input element, voice output units, a display, and memory locations, the game program instructing the computer to perform:
   notification for notifying that a player is prompted to input a voice;
   acquisition for repeatedly acquiring, after the notification, voice data representing a voice signal, having a predetermined time length, which is inputted to the voice input element;
   determination for determining, each time the voice data is acquired in the acquisition, whether or not the acquired voice data satisfies a predetermined selecting condition;
   first memory control for storing a collection comprising a partial subset of the voice data, which is determined to satisfy the predetermined selecting condition in the determination, in the memory locations as a piece of selected voice data; and
   voice output for outputting, when a game image showing a game character speaking is displayed on the display, a sound effect representing a voice of the game character from the voice output units by using a partial portion of a plurality of pieces of the selected voice data,
   wherein the sound effect representing a voice of the game character is meaningless.

2. The non-transitory storage medium according to claim 1, wherein
   in the first memory control, the computer stores the plurality of pieces of the selected voice data in a first area of the memory locations;
   the game program instructs the computer to further perform a second memory control for selecting, in accordance with a predetermined reference, at least one piece of the selected voice data from among the plurality of pieces of the selected voice data, and storing the at least one piece of the selected voice data in a second area of the memory locations; and
   in the voice output, the computer generates the sound effect by using at least a portion of the at least one piece of the selected voice data stored in the second area.

3. The non-transitory storage medium according to claim 2, wherein
   the notification is performed a plurality of times, and
   the game program instructs the computer to further perform a deletion for deleting, before the notification is to be performed, the voice data stored in the first area in a time period from when the notification has been most recently performed to when the notification is to be performed.

4. The non-transitory storage medium according to claim 1, wherein
   the game program instructs the computer to further perform an end determination for determining, after the notification is performed, whether or not an amount corresponding to the plurality of pieces of the selected voice data stored in the memory locations is equal to or greater than a predetermined amount, and
   the acquisition finishes acquiring the voice data if it is determined in the end determination that the amount corresponding to the plurality of pieces of the selected voice data stored in the memory locations is equal to or greater than the predetermined amount.

5. The non-transitory storage medium according to claim 1, wherein
   the game program instructs the computer to further perform an end determination for determining, after the notification is performed, whether or not a predetermined number of pieces of voice data, each of which is determined not to satisfy the predetermined selecting condition in the determination, are continuously acquired, and
   the acquisition finishes acquiring the voice data if it is determined in the end determination that the predetermined number of pieces of voice data, each of which is determined not to satisfy the predetermined selecting condition in the determination, are continuously acquired.

6. The non-transitory storage medium according to claim 1, wherein
   the predetermined selecting condition indicates that a variable concerning a size of amplitude of the voice signal represented by the voice data having been acquired is equal to or greater than a predetermine value.

7. The non-transitory storage medium according to claim 1, wherein
   the predetermined selecting condition indicates that a predetermined lower limit number of pieces of voice data, each having a variable, concerning a size of amplitude of the voice signal, which is equal to or greater than a predetermined value, are continuously acquired.

8. The non-transitory storage medium according to claim 1, wherein in the first memory control, when a predetermined upper limit number of pieces of voice data, each having a variable, concerning a size of amplitude of the voice signal, which is equal to or greater than a predetermined value, are continuously acquired, the computer stores the predetermined upper limit number of pieces of voice data in the memory locations as the piece of selected voice data.

9. The non-transitory storage medium according to claim 1, wherein
in the notification, the computer outputs a question for the player to at least either one of the display or the voice output units.

10. A game device including a voice input element, voice output units, a display, and memory locations, the game device comprising:
a processing system, including one or more computer processors configured to:
notify that a player is prompted to input a voice;
repeatedly acquire, after the notification, voice data representing a voice signal, having a predetermined time length, which is inputted to the voice input element;
determine, each time the voice data is acquired, whether or not the acquired voice data satisfies a predetermined selecting condition;
store a collection comprising a partial subset of the voice data, which is determined to satisfy the predetermined selecting condition, in the memory locations as a piece of selected voice data; and
output, when a game image showing a game character speaking is displayed on the display, a sound effect representing a voice of the game character from the voice output units by using a partial portion of a plurality of pieces of the selected voice data, wherein
the sound effect representing a voice of the game character is meaningless.

11. The non-transitory storage medium according to claim 1, wherein
a random partial subset of the selected pieces of voice data is used to produce a sound effect for the game character.

12. A method for executing a game in a game device including a voice input element, voice output units, a display, and memory locations, the method comprising:
notifying that a player is prompted to input a voice;
repeatedly acquiring, after the notification, voice data representing a voice signal, having a predetermined time length, which is inputted to the voice input element;
determining, via one or more computer processors, each time the voice data is acquired, whether or not the acquired voice data satisfies a predetermined selecting condition;
storing a collection comprising a partial subset of the voice data, which is determined to satisfy the predetermined selecting condition, in the memory locations as a piece of selected voice data; and
outputting, when a game image showing a game character speaking is displayed on the display, a sound effect representing a voice of the game character from the voice output units by using a partial portion of a plurality of pieces of the selected voice data, wherein
the sound effect representing a voice of the game character is meaningless.

* * * * *